United States Patent [19]
Bergquist et al.

[11] Patent Number: 5,096,537
[45] Date of Patent: Mar. 17, 1992

[54] TOWER SPRAY DRYER WITH HOT AND COOL AIR SUPPLY

[75] Inventors: Dwight H. Bergquist; Gary D. Lorimor; Thomas E. Wildy, all of Omaha, Nebr.

[73] Assignee: Henningsen Foods, Inc., White Plains, N.Y.

[21] Appl. No.: 545,050

[22] Filed: Jun. 28, 1990

[51] Int. Cl.$^5$ .............................. B01D 1/18
[52] U.S. Cl. .................. 159/4.01; 159/48.1; 34/57 A; 34/66; 426/471
[58] Field of Search ............ 159/48.1, 4.01, 4.08, 159/4.4; 34/10, 57 A, 57 R, 66, 67; 426/471

[56] References Cited

U.S. PATENT DOCUMENTS

| | | | |
|---|---|---|---|
| 1,548,665 | 8/1925 | Dickerson | 159/48.1 |
| 2,317,479 | 4/1943 | Peebles et al. | 159/48.1 |
| 2,835,597 | 5/1958 | Barzelay | 159/48.1 |
| 2,880,794 | 4/1959 | Marshall | 159/48.1 |
| 2,957,519 | 10/1960 | Walker | 159/48.1 |
| 3,305,091 | 2/1967 | Brady et al. | 159/48.1 |
| 3,519,054 | 7/1970 | Cavataio et al. | 159/4.01 |
| 3,803,723 | 4/1974 | Lamm et al. | 34/57 R |
| 3,884,659 | 5/1975 | Ray | 55/379 |
| 3,949,096 | 4/1976 | Johnson et al. | 426/302 |
| 4,362,273 | 12/1982 | Seino et al. | 34/31 |
| 4,600,472 | 7/1986 | Pitchon et al. | 159/48.1 |
| 4,655,806 | 4/1987 | Bowersox | 55/302 |

Primary Examiner—Wilbur Bascomb, Jr.
Attorney, Agent, or Firm—Stoll, Previto & Hoffman

[57] ABSTRACT

A tower spray dryer for spray drying a product having a vertically oriented drying chamber. A spray nozzle is provided above the drying chamber which sprays a product into said drying chamber. A heater is provided for supplying hot air to a plenum tube above the drying chamber. The hot air is passed into the drying chamber to enable the product and hot air to be thoroughly mixed together. Cool air is also introduced into the drying chamber at low velocity. The exposure time of the product to the hot air is short and the hot air is introduced to the drying chamber at high velocity.

18 Claims, 3 Drawing Sheets

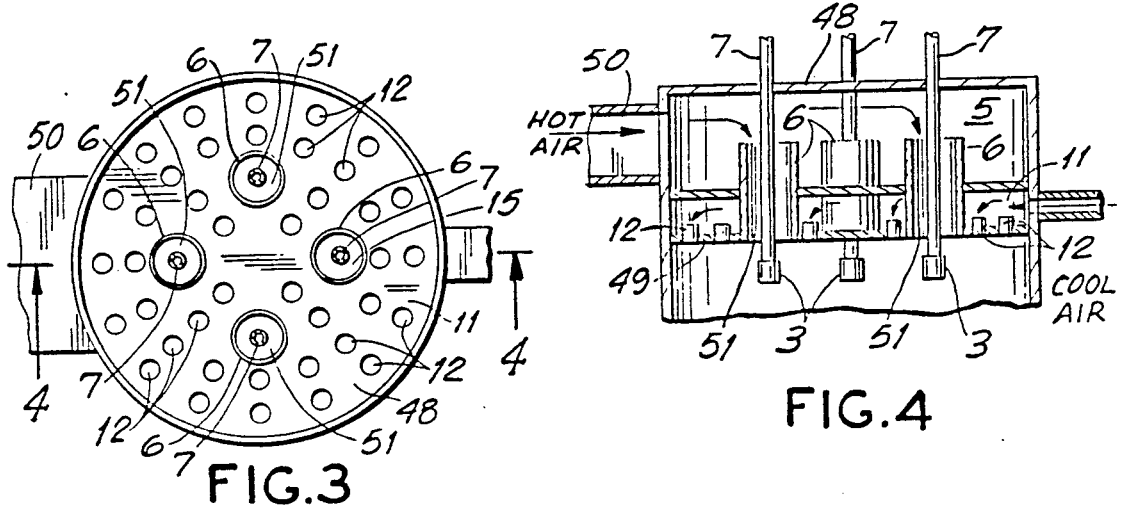
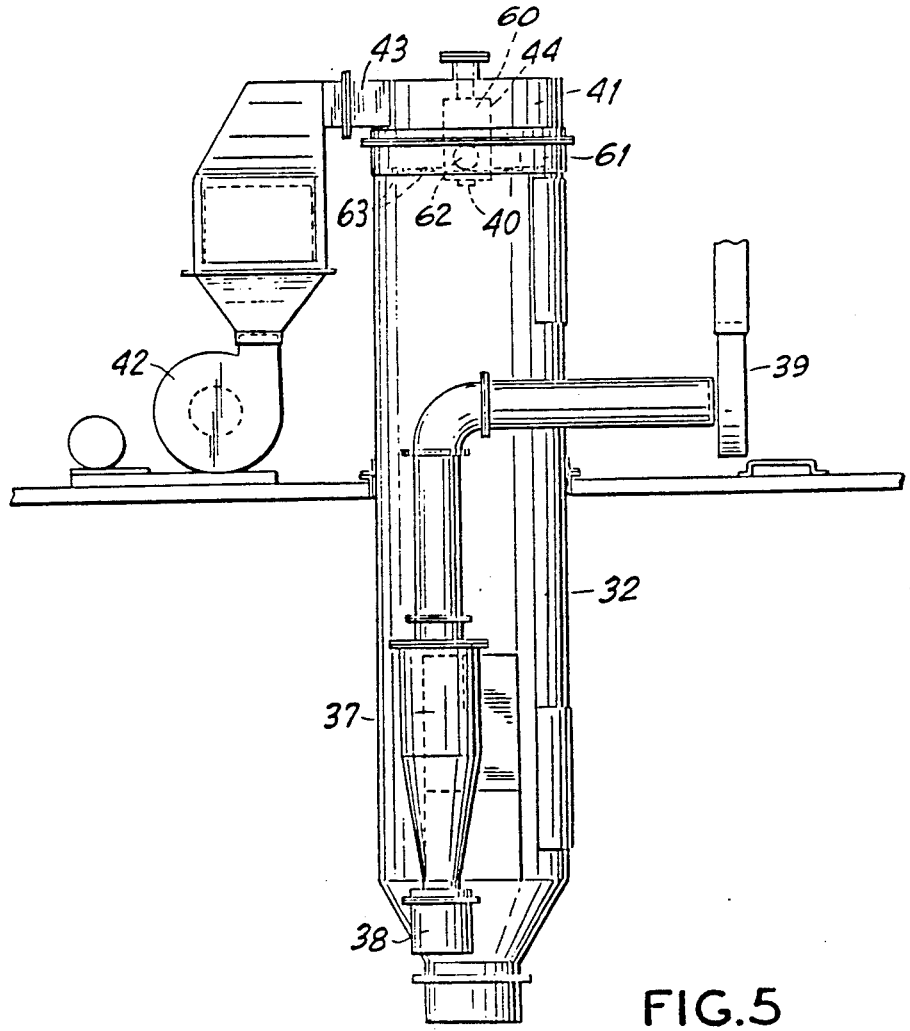

TOWER SPRAY DRYER WITH HOT AND COOL AIR SUPPLY

BACKGROUND

The present invention relates to spray dryers for spray drying food products and more particularly to an improved tower spray dryer.

Existing tower spray dryers have vertically oriented drying chambers. They operate at relatively high outlet temperatures (above 170° F.) when spray drying most food products. These existing tower spray dryers cause heat damage to the product. Furthermore, thermal efficiency is poor and such dryers also expose the dry food product for long periods of time to the drying air.

OBJECTS

In overcoming the drawbacks of existing tower spray dryers, it is one object of the present invention is to provide an improved tower spray dryer in which outlet temperatures are very low.

Another object of the present invention is the provision of an improved tower spray dryer which causes thorough mixing of the hot air and the sprayed product to improve efficiency of water evaporation.

Another object of the present invention is the provision of an improved tower spray dryer in which the exposure time is very short.

Another object of the present invention is the provision of an improved tower spray dryer which has very high thermal efficiency.

Anther object of the present invention is the provision of an improved tower spray dryer in which there is no heat damage to the product.

Another object of the present invention is the provision of an improved tower spray dryer in which air is uniformly distributed around the spray nozzle.

Another object of the present invention is the provision of an improved spray dryer in which the air moving through the drying chamber is at high velocity.

Another object of the present invention is the provision of an improved spray dryer in which the collector for the product is close to the drying chamber.

Other and further objects of the invention will be obvious upon an understanding of the illustrative embodiment about to be described, or will be indicated in the appended claims and various advantages not referred to herein will occur to one skilled in the art upon employment of the invention in practice.

SHORT DESCRIPTION

The spray dryer of the present invention avoids the above problems and provides an improved tower spray dryer in which the outlet temperatures of the hot air after it leaves the drying chamber are very low (well below 170° F., depending on the product, and for some products as low as 130° F.). In addition, the improved tower spray dryer of the present invention uses an exposure time which is very short (less than 40 seconds, with most of the product given less exposure time than this). Maximum collection efficiency is achieved because of location of a pluse jet bag collector (close to 100% of all products are recovered). The thorough mixing of the heat and the sprayed product results in very high thermal efficiency. This results in products with excellent quality and no heat damage.

The low outlet temperatures are obtained by having excellent mixing of the spray drying air. It has been found that by using relatively high velocity (about 2,000 to 4,000 ft. per minute) through the drying air inlet open (which may be 12 inches or less in diameter), excellent mixing of the spray with the drying and low outlet temperatures can be achieved. The air is uniformly distributed around the spray nozzle which is located at the center of the drying air inlets which conduct the heated drying air into the drying chamber.

It also has been found that by allowing low velocity cooling air to enter through the orifice plate surrounding the drying air inlets, the walls, ceiling and floor of the drying chamber can be kept cool so that burning of the production is prevented. The cooling air need only be a very small percentage of the total drying through the dryer, for example 5% of the drying air.

Short exposure time of the dryer is achieved by having a relatively high velocity of air through the drying chamber and by having a secondary collector as close to the drying chamber as possible. If a cyclone collector is used, it should be close to the chamber. If a pulse jet type collector is used, it should be a part of the drying chamber. With a cyclone collector, recovery depends on the type of product being dried. Some products can be spraye dried using the cyclone collector with almost 100% collection efficiency, while other products (such as egg white spray) dried on the same dryer, would have only 95% collection efficiency. However, 100% collection efficiency can be achieved for almost any product using a pulse-type bag collector and this is the preferred type of collector to be used with the present invention. It is noted that the bag collector practically becomes part of the drying chamber while the cyclone collector is very close to the outlet of the drying chamber to give the shortest exposure time possible.

DESCRIPTION OF THE DRAWINGS

A preferred embodiment of the invention has been chosen for purposes of illustration and description and is shown in the accompanying drawings forming a part of the specification, wherein:

FIG. 3 is a schematic simplified top plan view of a portion of the spray dryer shown in FIGS. 1 and 2.

FIG. is a sectional view taken along line 4—4 of FIG. 3.

FIG. 5 is a diagrammatic side elevational view of another embodiment of a tower spray dryer in accordance with the present invention.

Figure 1:
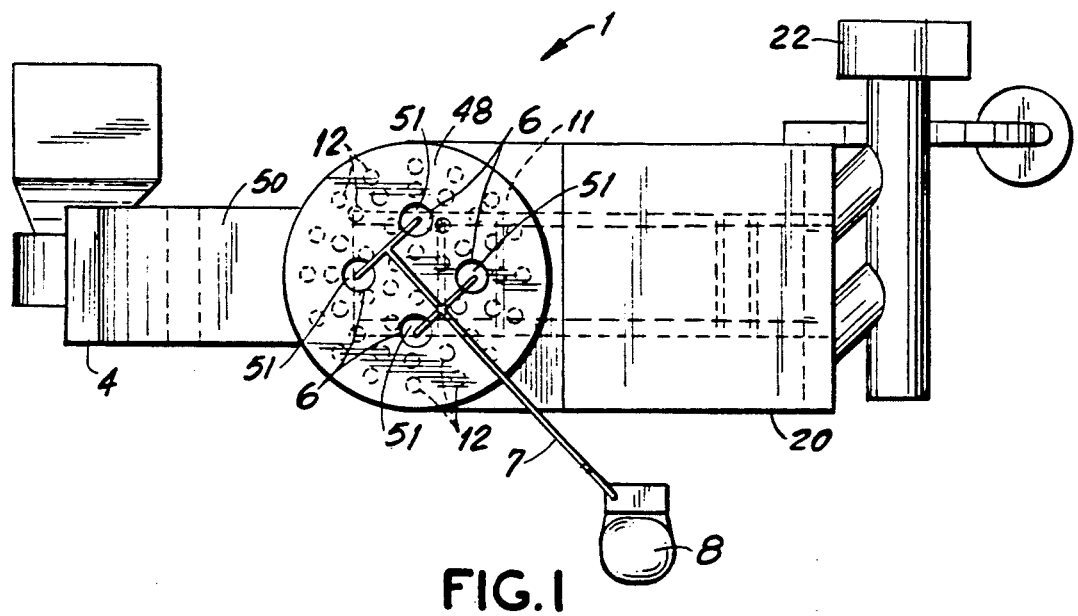
FIG. 1 is a diagrammatic top view of a tower spray dryer made in accordance with the present invention.
Figure 2:
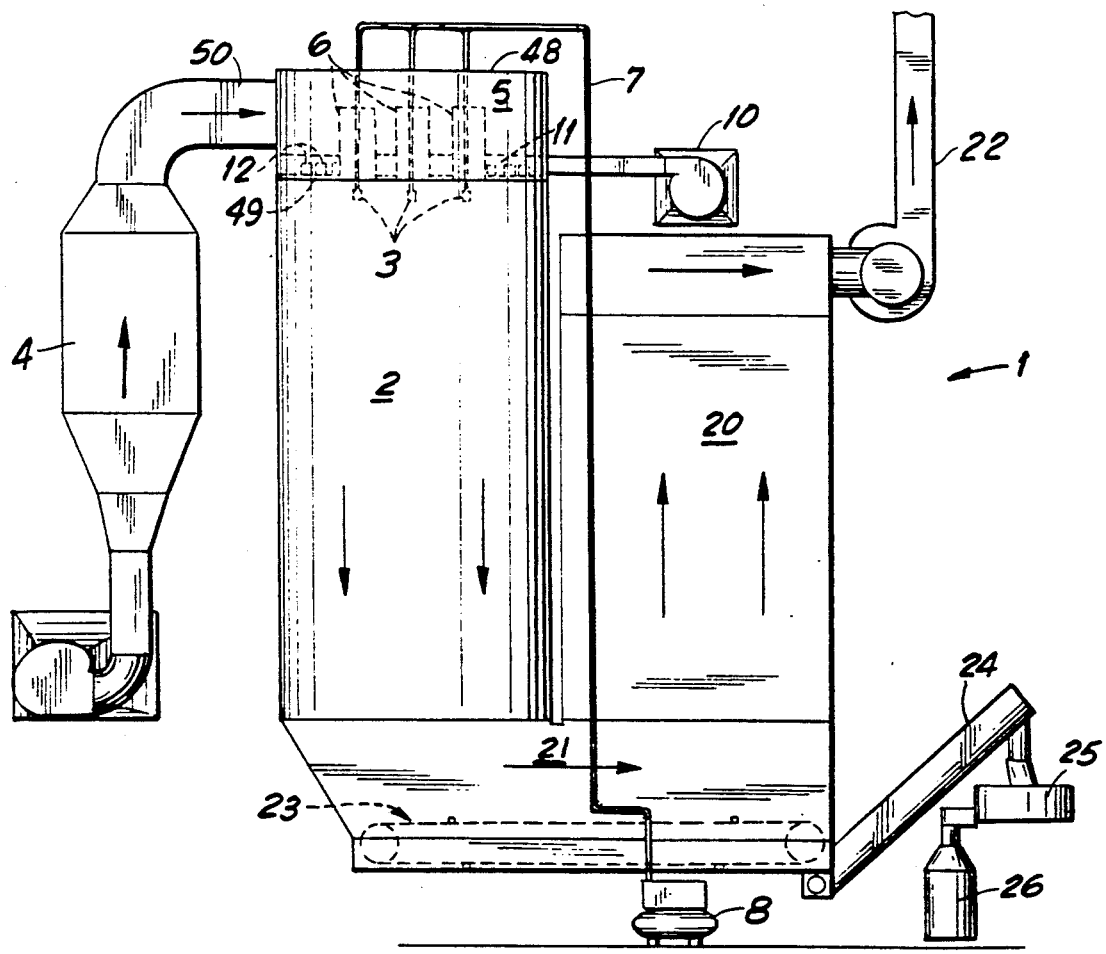
FIG. 2 is a side elevational view thereof.
Figure 6:
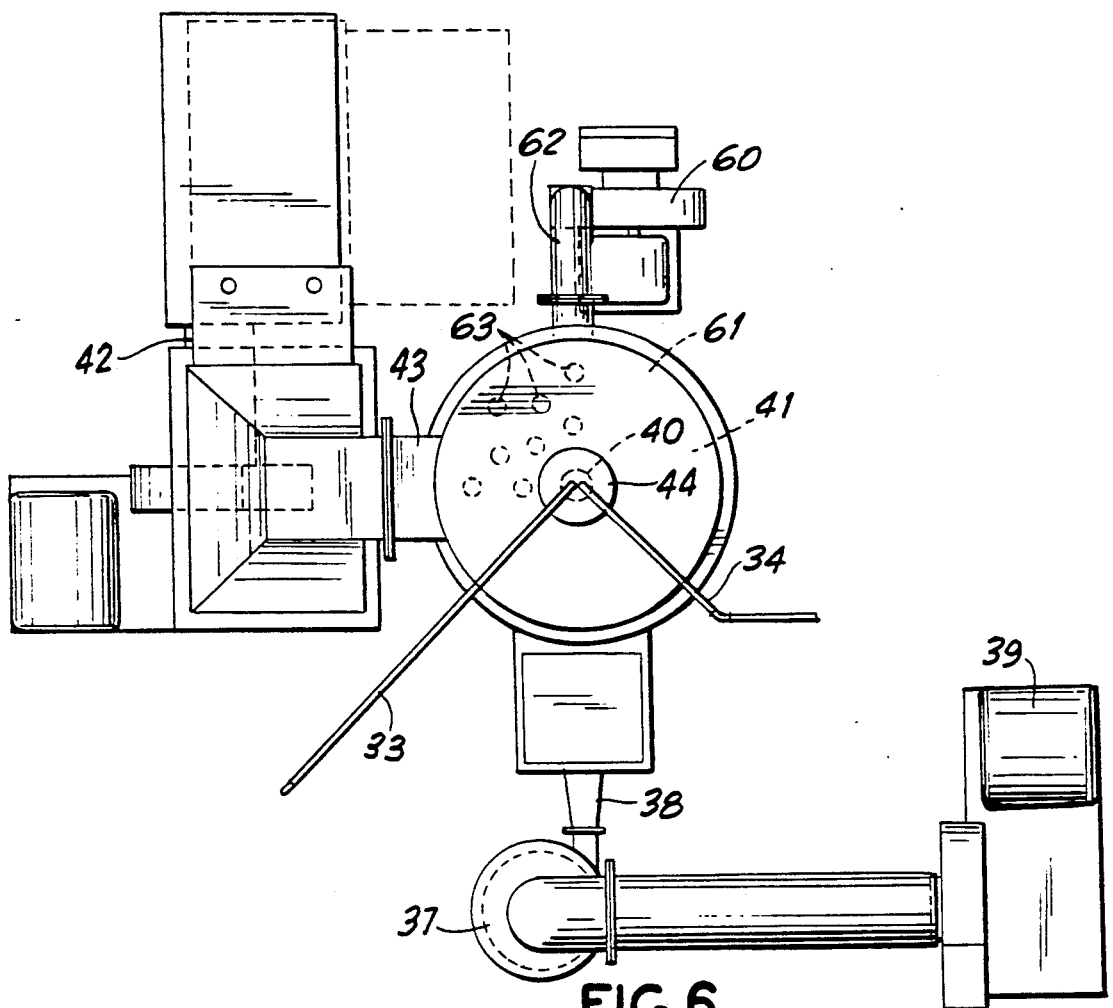

FIG. 6 is a top plan view thereof.

Figure 7:
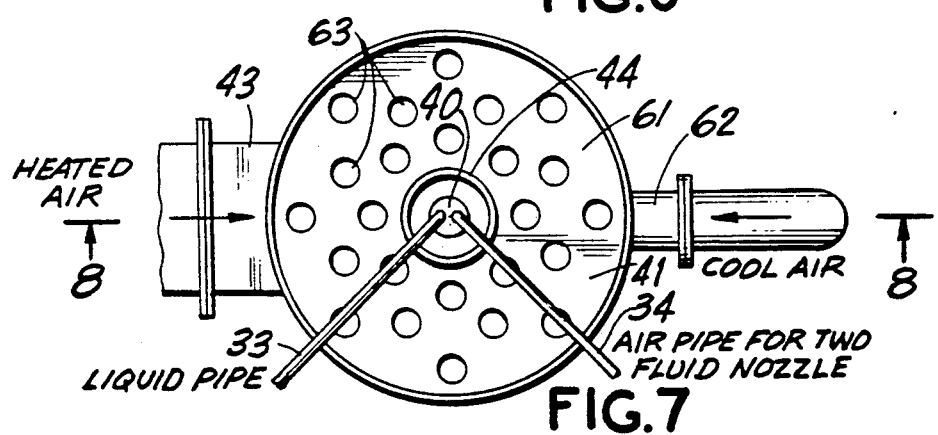

FIG. 7 is a schematic simplified top plan view of a portion of the spray dryer shown in FIGS. 5 and 6.

Figure 8:
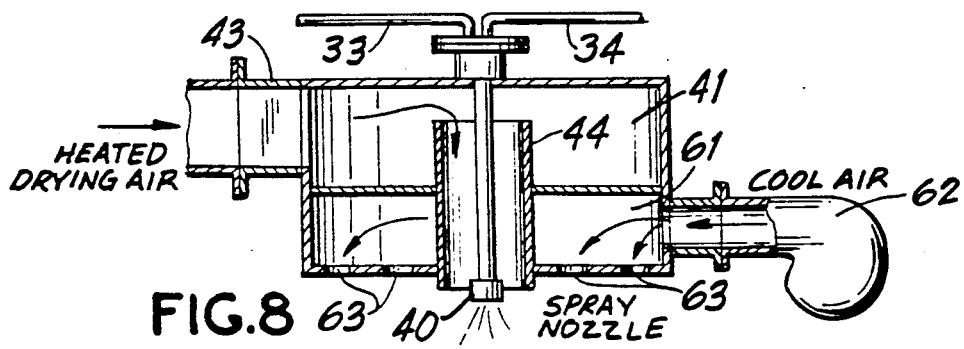

FIG. 8 is a sectional view taken along line 8—8 of FIG. 7.

DESCRIPTION

Referring to the drawings and more particularly to the tower spray dryer shown in FIGS. 1-4, the spray dryer 1 of the present invention comprises a vertically oriented spray drying chamber 2 having a plurality of spraying drying nozzles 3 at the top. The drying chamber 2 is an elongated chamber being of a height which can range from 10 feet to 20 feet high. It is provided with a top wall 48 and a plenum wall 49 spaced therebeneath to form a plenum 5 therebetween. A heating unit 4 supplies hot air to the plenum 5 through conduit 50. A plurality of plenum tubes 6 conduct the hot air from the plenum 5 into the drying chamber 2 through openings 51 in the plenum wall 49. Spray drying nozzles 3 are provided within each plenum tube 6 and in spaced relationship with the inner side walls of each. The nozzles 3 are supplied with the product to be dried by high pressure lines 7 through which the product passes under the influence of a high pressure pump 8. The spray drying nozzles 3 and their supply lines 7 extend through the plenum tubes 6 into the drying chamber 2 as is well known in such high pressure spray drying systems. Four spray drying nozzles 3 are shown in the embodiment of FIGS. 1-4, however, the number may vary if desired. It will also be appreciated that an atomizing spray nozzle system, such as the one which will be described in connection with the embodiment in FIGS. 5-8, may also be used in the embodiment of FIGS. 1-4.

A cool air pump 10 forces cool air through a manifold 11 and into the spray drying chamber 2 through a number of small cool air outlets 12. In the drawing, the mainifold 11 (as well as the spray dryer itself) has been shown as being circular although it is within the purview of this invention to make both the manifold 11 and the spray of a different shape. The cool air enters the drying chamber 2 at approximately the same level where the spray drying nozzles 3 spray the product into the drying chamber 2. As is shown in the drawings, the cool air outlets 12 surround the plenum tubes 6 and are interposed therebetween. It will also be noted that the cool air tubes are much smaller in diameter than the plenum tubes 6. It will be seen that cool air is introduced into the elongated drying chamber 2 immediately at the elevational level where the spray nozzles 3 are spraying the product into the elongated drying chamber 2. This cools the product and the drying air as both enter the drying chamber 2.

A collector 20, preferably any well-known pluse jet type collector, is provided having an opening 21 at the bottom which communicates with the drying chamber 2. The hot air from the plenum tubes 6 moves downwardly in the drying chamber 2 through the opening 21 and upwardly through the collector 20 and out to an exhaust fan 22. The product which is being dried falls to the bottom of the drying chamber 2 where a conveyor system 23 moves it towards a screw elevator 24 which will convey the dried product through a sifter 25 and into a package 26 to be shipped or stored. It will be noted that other types of collectors, such as the one described in the embodiment of FIGS. 5-7, may also be used in the embodiment of FIGS. 1-4.

Referring to the embodiment of FIGS. 5-8, a similar vertically oriented and elongated spray drying chamber 32 is shown. This spray drier is provided with an atomizing spray nozzle 40 which comprises and is fed by a product inlet tube 33 and an air line 34 is usual in such two-pipe atomizing spray dryer systems.

The spray nozzle 40 is a so-called two-fluied atomizer spray nozzle in which liquid product is piped in from one source 33 and air is piped in from another source 34. Both pipes 33 and 34 lead the air and the liquid into the spray nozzle 40, which are then sprayed out and atomized. Of course, it will be understood that a high pressure spray nozzle such as the one described in the embodiment of FIGS. 1-4 may also be used in the spray dryer shown in this embodiment without departing from the invention.

Heated air is moved into the plenum 41 from a heat source 42 through conduit 43. The heated air enters the elongated drying chamber 32 through plenum tube 44 which surrounds the piping 33-34 of the spray nozzle 40. Cool air is pumped by a source 60 to a manifold 61 by a tubing 62. The cool air is ejected from the mainfold 61 and into the elongated drying chamber 32 through a plurality of smaller cool air outlets 63 which are smaller in diameter than and surround the plenum tube 44.

It will be seen that cool air is introduced into the elongated drying chamber 32 immediately at the elevational level where the spray nozzle 40 is spraying the product into the elongated drying chamber 32. This cools both the product and the drying air as they enter the drying chamber 32.

In this embodiment, the product collector is any well-known cyclone collector 37 which is adjacent to the elongated drying chamber 32 and communicates therewith by means of conduit 38. The hot air from the plenum tube 44 descends, enters the collector 37 through tube 38 and is exhausted by the exhaust fan 39. It will be understood that other collectors, such as the one described with respect to the embodiment of FIGS. 1-4, may also be used in the embodiment of FIGS. 5-8.

The dried product moves down the drying chamber 32 and the settles on a conveyor system which may be similar to the one described in embodiment 1-4 to remove the product.

Both embodiments of the two spray dryers described above achieve high efficiency in evaporation of water by thorough mixing of the hot air with the spray product and produce outlet temperatures which are very low (well below 170° F. and in some instances as low as 130° F.). These low temperatures are the result of the cool air entering the drying chamber at a level adjacent the level of the spray nozzles. In addition, exposure time of the product to the heat is very short (less than 40 seconds) and heat damage is eliminated. Efficiency of the collector is achieved because of location of the collector close to the drying chamber.

The low outlet temperatures are obtained by mixing of the spray drying air with the cool air. In additiion, by moving air at a high velocity (about 2,000 to 4,000 ft. per minute) through the plenum tubes, excellent mixing of the spray with the drying air and low outlet temperatures are achieved. The walls, ceiling and floor of the drying chamber can be kept cool by having the cooling air enter the drying chamber a low velocity. Hence, burning of the product is prevented.

Short exposure time of the product in the drying chamber is the result of moving air through the drying chamber at a high velocity and by having the collector close to the drying chamber.

The dryer of the present invention was tested in the spray drying of egg yolk and was found to give excellent results. With the spray dried egg yolk, the amount of heat imparted to the product during drying of egg yolk is indicated by the reconstituted viscosity of about 200 cps before spray drying. Normally, after spray drying the viscosity the yolk increases to anywhere from 1500 to 4000 cps. From some earlier spray dryers, the yolk is so thick when reconstituted, the viscosity can't even be measured.

The amount of heat imparted to the yolk during spray drying increases the viscosity of the yolk. The more heat, the higher the viscosity. The reconstituted viscosity of dried egg yolk from the main chamber was 200 cps and coming out of the secondary collector was 260 cps. The two blended together gave 210 cps, with the cyclone powder being 10% of the total recovered solids. 100% of the solids was recovered from the yolk within the main chamber and cyclone. These results indicate that little heat was imparted to the product in the dryer. Because of this, spray dried products dried in accordance with the present invention are of the highest quality that can be achieved.

A one-nozzle dryer has a capacity of about 250-300 lb. water evaporated per hour. Therefore, to achieve higher capacities, additional nozzles are added to form a multiple-nozzle system. For example, a 4-nozzle dryer has a capacity of 1,000 to 1,2000 lb. of water evaporated per hour and an 8-nozzle dryer has a capacity of 2,000 to 2,400 lb. The greater the number of nozzles the higher the capacity.

The height of the drying chamber of the present invention is determined by the size of the particle of dried product desired. The larger the particle size the higher the drying chamber should be. For example, under normal conditions, spray drying to a mean particle size of 45 microns diameter, a height of 16 to 24 feet is required. If a mean diameter of 120 microns is desired, the drying chamber should be about 50 feet tall. This, of course, depends on the drying characteristics of product being spray dried as well. A small pilot plant spray dryer using two-fluid nozzle atomization of the liquid to a particle size of 25 microns may have a height of about 10 feet.

Another advantage of a tower spray dryer of the present invention is that bulk density is at the maximum that can be achieved of a spray dried product. This is due to the fact that air with a spray and the uniformity of the air coming into the dryer around the spray, the particles can be dried immediately before agglomeration occurs. If a lower bulk density product is desired, one can inject gas into the liquid before spraying into the drying chamber.

It will thus be seen that the present invention provides an improved tower spray dryer in which outlet temperatures are very low an in which exposure time is very short with resulting very high thermal efficiency which cause no heat damage to the product. The tower spray dryer described hereinabove improves efficiency of water evaporation through the thorough mixing of the sprayed product with the hot air.

As many and varied modifications of the subject matter of this invention will become apparent to those skilled in the art from the detailed description given hereinabove, it will be understood that the present invention is limited only as provided in the claims appended hereto.

The embodiments of the invention in which an exclusive property or privilege is claimed are defined as follows:

1. A tower spray dryer for spray drying a food product comprising a vertically oriented drying chamber, at least one spray nozzle at the top of the drying chamber adapted to spray the product into said drying chamber, a plenum above the drying chamber, means for moving hot air into the plenum, said plenum comprising a horizontally oriented plenum, at least one plenum tube extending through the plenum wall and communicating with the drying chamber to allow hot air to pass from the plenum into the drying chamber through the plenum tube, said spray nozzle extending through said plenum tube and into said drying chamber, a horizontally oriented manifold above said plenum wall, means for supplying cool air to said mainifold, at least one cool air opening in said plenum wall adjacent said plenum tube and communicating with said manifold and said drying chamber to allow cool air to enter the drying chamber adjacent said nozzel, whereby the product, the hot air and the cool air are thoroughly mixed together immediately upon entering the drying chamber.

2. A tower spray dryer as set forth in claim 1 wherein there is a plurality of plenum tubes and a plurality of said cool air openings surround said plenum tubes.

3. A tower spray dryer as set forth in claim 2 wherein means are provided to pass the cool air into the drying chamber at low velocities.

4. A tower spray dryer as set forth in claim 3 wherein said means for supplying cool air supplies about 5 percent of the total air passing into the driving chamber.

5. A tower spray dryer as set forth in claim 2 wherein said supply of cool air supplies sufficient cool air to keep the temperatures in the drying chamber below 170° F.

6. A tower spray dryer as set forth in claim 5 wherein said supply of cool air supplies sufficient cool air to keep temperatures in the drying chamber between 130° F. and below 170° F.

7. A tower spray dryer as set forth in claim 6 wherein means are provided to allow the exposure time of the product to the hot air to be short.

8. A tower spray dryer as set forth in claim 7 wherein said means limit the exposure time to less than 40 seconds.

9. A tower spray dryer as set forth in claim 6 wherein means are provided to allow the hot air to be introduced into the drying chamber at a high velocity.

10. A tower spray dryer as set forth in claim 9 wherein said last-mentioned means allow the velocity of said hot air to be above 2,000 ft. per minute.

11. A tower spray dryer as set forth in claim 10 wherein said last-mentioned means allow the velocity of said air to be between above 2,000 ft. and 4,000 ft. per minute.

12. A tower spray dryer as set forth in claim 9 wherein a product collector is located adjacent the drying chamber.

13. A tower spray dryer as set forth in claim 12 wherein said product collector communicates with said drying chamber adjacent the lower end of the drying chamber.

14. A tower spray dryer as set forth in claim 13 wherein said product collector is a pulse jet type collector.

15. A tower spray dryer as set forth in claim 13 wherein said product collector is a cyclone collector.

16. A tower spray dryer as set forth in claim 12 wherein said spray nozzle is a high-pressure nozzle and supplied with the product by a high pressure pump.

17. A tower spray dryer as set forth in claim 16 wherein means are provided to move air under pressure together with said product to the said spray nozzle.

18. A tower spray dryer as set forth in claim 12 wherein said spray nozzle is an atomizing spray nozzle and is supplied with the product and air by separate conduits.

* * * * *